(12) United States Patent
LLosa et al.

(10) Patent No.: US 11,760,963 B2
(45) Date of Patent: Sep. 19, 2023

(54) KETOGENIC BEER AND ALCOHOLIC BEVERAGE MIXTURE CONTAINING NON-RACEMIC ETHYL 3-HYDROXYBUTYRATE AND/OR 1,3 BUTANEDIOL

(71) Applicant: KetoneAid Inc., Falls Church, VA (US)

(72) Inventors: Frank Borges LLosa, Falls Church, VA (US); Stephen Zarpas, Washington, DC (US)

(73) Assignee: KetoneAid Inc., Falls Church, VA (US)

( * ) Notice: Subject to any disclaimer, the term of this patent is extended or adjusted under 35 U.S.C. 154(b) by 744 days.

(21) Appl. No.: 16/168,703

(22) Filed: Oct. 23, 2018

(65) Prior Publication Data

US 2019/0177673 A1    Jun. 13, 2019

Related U.S. Application Data

(60) Provisional application No. 62/548,969, filed on Aug. 23, 2017.

(51) Int. Cl.
| | | |
|---|---|---|
| *C12C 5/02* | (2006.01) | |
| *C12C 12/04* | (2006.01) | |
| *C12C 11/11* | (2019.01) | |

(52) U.S. Cl.
CPC .............. *C12C 5/026* (2013.01); *C12C 12/04* (2013.01); *C12C 11/11* (2013.01)

(58) Field of Classification Search
CPC ......... C12C 5/026; C12C 12/04; C12C 11/11; C12C 5/00; C12C 5/02; C12C 5/023;
(Continued)

(56) References Cited

U.S. PATENT DOCUMENTS

| 4,997,976 A | 3/1991 | Brunengraber et al. |
| 5,112,865 A | 5/1992 | Nichels et al. |

(Continued)

FOREIGN PATENT DOCUMENTS

| AU | 2004245567 A1 | 12/2004 |
| EP | 1755743 A2 | 2/2007 |

(Continued)

OTHER PUBLICATIONS

Burnett, A.L., "The Role of Nitric Oxide in Erectile Dysfunction: Implications for Medical Therapy," *The Journal of Clinical Hypertension* 8(s12):53-62, Wiley-Blackwell Publishing Ltd., United States (Dec. 2006).

(Continued)

*Primary Examiner* — Vera Stulii
(74) *Attorney, Agent, or Firm* — STERNE, KESSLER, GOLDSTEIN & FOX P.L.L.C.

(57) ABSTRACT

A beverage can include D ethyl 3-hydroxybutyrate, D 1,3-butanediol, D Beta hydroxybutyrate salts, D Beta hydroxybutyrate/D 1,3-butanediol monoester, D ethyl hydroxybutyrate, hydroxybutyrate, and/or D hydroxybutyric acid of at least 0.5 percent by volume. The percentage of D ethyl 3-hydroxybutyrate, D 1,3-butanediol, D Beta hydroxybutyrate salts, D Beta hydroxybutyrate/D 1,3-butanediol monoester, D ethyl hydroxybutyrate, hydroxybutyrate, and D hydroxybutyric acid can be between 5 and 19 percent, or can be higher than 19 percent. The beverage can be improved by the incorporation of flavor from hops and/or from other ingredients.

18 Claims, 4 Drawing Sheets

(58) Field of Classification Search
CPC ......... C12C 5/04; C12C 11/00; C12C 11/003; C12C 12/00; C12C 12/02; A23L 2/00; A23L 2/02; A23L 2/04; A23L 2/06; A23L 2/38; A23L 2/382; A23L 2/52; A23L 2/56; A23L 2/58; A23L 2/60; A23L 2/66; A23L 2/68; A23F 3/00; C12G 1/00; C12G 1/06; C12G 1/14; C12G 3/00; C12G 3/02; C12G 3/025; C12G 3/026; C12G 3/04; C12G 3/05; C12G 3/055; C12G 3/06; C12G 3/07; C12G 3/08
USPC .................................................. 426/590, 592
See application file for complete search history.

(56) References Cited

U.S. PATENT DOCUMENTS

| | | | |
|---|---|---|---|
| 5,126,373 | A | 6/1992 | Brunengraber et al. |
| 6,207,856 | B1 | 3/2001 | Veech |
| 6,316,038 | B1 | 11/2001 | Veech |
| 6,323,237 | B1 | 11/2001 | Veech |
| 6,380,244 | B2 | 4/2002 | Martin et al. |
| 6,613,356 | B1 | 9/2003 | Vlahakos |
| 7,351,736 | B2 | 4/2008 | Veech |
| 8,101,653 | B2 | 1/2012 | Veech |
| 8,642,654 | B2 | 2/2014 | Clarke et al. |
| 9,034,613 | B2 | 5/2015 | Robertson et al. |
| 9,138,420 | B2 | 9/2015 | D'Agostino et al. |
| 9,211,275 | B2 | 12/2015 | Clarke et al. |
| 9,579,302 | B2 | 2/2017 | Veech et al. |
| 10,051,880 | B2 | 8/2018 | Clarke et al. |
| 10,154,982 | B2 | 12/2018 | Clarke et al. |
| 10,245,242 | B1 | 4/2019 | Millet |
| 10,292,952 | B2 | 5/2019 | Millet |
| 10,478,415 | B2 | 11/2019 | Veech et al. |
| 10,588,876 | B2 | 3/2020 | Millet |
| 10,596,129 | B2 | 3/2020 | Millet |
| 10,596,313 | B2 | 3/2020 | Gregory et al. |
| 10,736,861 | B2 | 8/2020 | Millet |
| 2003/0138384 | A1* | 7/2003 | Stephenson ............... A23L 2/38 424/49 |
| 2006/0280721 | A1 | 12/2006 | Veech et al. |
| 2010/0004194 | A1 | 1/2010 | Berg et al. |
| 2011/0237666 | A1 | 9/2011 | Clarke et al. |
| 2011/0287131 | A1 | 11/2011 | Murali et al. |
| 2012/0329742 | A1 | 12/2012 | Weg |
| 2013/0102663 | A1 | 4/2013 | Clarke |
| 2014/0010939 | A1 | 1/2014 | Krohn et al. |
| 2014/0308719 | A1 | 10/2014 | Clarke et al. |
| 2014/0350105 | A1 | 11/2014 | D'Agostino et al. |
| 2015/0065571 | A1* | 3/2015 | Clarke .................... A61P 21/06 514/546 |
| 2015/0238494 | A1 | 8/2015 | Owoc |
| 2016/0030314 | A1 | 2/2016 | Clarke et al. |
| 2017/0266148 | A1 | 9/2017 | D'Agostino et al. |
| 2017/0296501 | A1 | 10/2017 | Lowery et al. |
| 2018/0057846 | A1 | 3/2018 | Llosa et al. |
| 2018/0195096 | A1 | 7/2018 | Veech et al. |
| 2019/0014798 | A1 | 1/2019 | Clarke et al. |
| 2019/0119705 | A1 | 4/2019 | Llosa et al. |
| 2019/0201366 | A1 | 7/2019 | Clarke et al. |
| 2020/0121623 | A1 | 4/2020 | Millet |
| 2020/0289444 | A1 | 9/2020 | Thomas et al. |
| 2020/0347413 | A1 | 11/2020 | LLosa et al. |
| 2020/0360517 | A1 | 11/2020 | Clarke |
| 2020/0385331 | A1 | 12/2020 | LLosa |

FOREIGN PATENT DOCUMENTS

| | | |
|---|---|---|
| WO | WO-2005023290 A2 | 3/2005 |
| WO | WO-2010021766 A1 | 2/2010 |
| WO | WO-2014153416 A1 | 9/2014 |
| WO | WO-2017156446 A1 | 9/2017 |
| WO | WO-2018115158 A1 | 6/2018 |
| WO | WO-2019104082 A1 | 5/2019 |

OTHER PUBLICATIONS

Cox, P.J., et al., "Nutritional Ketosis Alters Fuel Preference and Thereby Endurance Performance in Athletes," *Clinical and Translational Report* 24(2):256-268, Elsevier Inc., Netherlands (Aug. 2016).

Desrochers, S., et al., "R,S-1,3-butanediol acetoacetate esters, potential alternates to lipid emulsions for total parenteral nutrition," *The Journal of Nutritional Biochemistry* 6(2):111-118, Elsevier Inc., Netherlands (Feb. 1995).

Le Sann, C., et al., "Assembly intermediates in polyketide biosynthesis: enantioselective syntheses of beta-hydroxycarbonyl compounds," *Org Biomol Chem* 3(9):1719-1728, Royal Society of Chemistry, United Kingdom (Mar. 2005).

Office Action dated Mar. 22, 2019, in U.S. Appl. No. 15/688,690, LLosa, F.B., et al., filed Aug. 28, 2017, 9 pages.

Office Action dated Jul. 8, 2019, in U.S. Appl. No. 16/408,424, LLosa, F.B., filed May 9, 2019, 18 pages.

Office Action dated Jun. 16, 2020, in U.S. Appl. No. 16/167,449, LLosa, F.B., et al., filed Oct. 22, 2018, 11 pages.

Final Office Action dated Feb. 22, 2021, in U.S. Appl. No. 16/167,449, LLosa, F.B., et al., filed Oct. 22, 2018, 12 pages.

World Health Organization, "Butane-1,3-diol," *International Programme of Chemical Safety: Toxicological Evaluation of Certain Food Additives*, WHO Food Additives Series 14, Geneva (Apr. 2-11, 1979).

Office Action dated Apr. 15, 2021, in U.S. Appl. No. 16/736,136, LLosa, F.B., et al., filed Jan. 7, 2020, 20 pages.

Office Action dated Aug. 31, 2021, in U.S. Appl. No. 16/167,449, LLosa, F.B., et al., filed Oct. 22, 2018, 17 pages.

Office Action dated Jul. 11, 2022, in U.S. Appl. No. 16/947,036, LLosa, F.B., filed Jul. 15, 2020, 8 pages.

Office Action dated Feb. 2, 2022, in U.S. Appl. No. 17/455,826, LLosa, F.B., filed Nov. 19, 2021, 24 pages.

Office Action dated Jul. 1, 2022, in U.S. Appl. No. 17/455,826, LLosa, F.B., filed Nov. 19, 2021, 19 pages.

Advisory Committee on Novel Foods and Proccesses (ACNFP), "Application for the Approval of (3)-R-hydroxybutyl (3)-R-hydroxybutyrate Under Regulation (EC) No. 258/97 of the European Parliament and of the Council of Jan. 27, 1997 Concerning Novel Foods and Novel Food Ingredients," Government of the United Kingdom, United Kingdom, 69 pages (Jul. 24, 2013).

Clarke, K., et al., "Kinetics, safety and tolerability of (R)-3-hydroxybutyl (R)-3-hydroxybutyrate in healthy adult subjects," *Regulatory Toxicology and Pharmacology* 63(3), 19 pages, Elsevier, Netherlands (Aug. 2012).

Challener, Cynthia, "Bio-butylene glycol makes its debut," *ICIS Chemical Business*, Oct. 13-19, 2017, p. 11, ICIS, New York.

Office Action dated Feb. 21, 2023, in U.S. Appl. No. 17/455,826, Llosa, F.B., filed Nov. 19, 2021, 30 pages.

* cited by examiner

D Ethyl 3-hydroxybutyrate 3-hydroxy-, 3-ethoxy-1-methyl-3-oxopropyl ester

KETOGENIC BEER AND ALCOHOLIC BEVERAGE MIXTURE CONTAINING NON-RACEMIC ETHYL 3-HYDROXYBUTYRATE AND/OR 1,3 BUTANEDIOL

TECHNICAL FIELD

This invention generally relates to beverages containing D ethyl 3-hydroxybutyrate and/or D 1,3-butanediol and in particular to low carb beers, beer-flavored beverages, sparkling water, spirits, and alcoholic beverages, in place of or in addition to ethanol, which can facilitate the initiation or maintenance of ketosis for persons trying to adhere to a ketogenic diet.

BACKGROUND

Ethyl 3-hydroxybutyrate, also known as Ethyl 3-hydroxybutanoate, 3-Hydroxybutyric Acid Ethyl Ester is a well known flavor molecule and is an alcohol.

1,3-butanediol is also known as 1,3-butylene glycol, butane-1,3-diol, or 1,3-dihydroxybutane. 1,3-butanediol is an organic compound, one of four stable isomers of butanediol. It is also an alcohol. As shown in various studies, 1,3-butanediol can be safe for human consumption.

Ketosis is a fat-based metabolism, a state indicated by elevated levels of ketones in the blood and in which a person's body produces ketones for fueling metabolism rather than primarily using glycogen to make glucose. The ketogenic diet, which can initiate and maintain ketosis, was developed initially to treat pediatric refractory epilepsy. The original diet required ingesting calories primarily from fat, with a minimally sufficient amount of proteins to allow for growth and repair, and with a very restricted amount of carbohydrates. A typical diet would include a 4:1 ratio of fat to combined protein and carbohydrate (by weight). The ketogenic diet can allow one's body to consume fats for fuel rather than carbohydrates. Normally, the carbohydrates contained in food are stored as glycogen in the body and then, when needed, converted into glucose. Glucose is particularly important in fueling brain-function.

When a body lacks carbohydrates, the liver converts fat into fatty acids and ketone bodies. The ketone bodies pass into the brain and replace glucose as an energy source. An elevated level of ketone bodies in the blood, i.e. ketosis, has been shown to reduce the frequency of epileptic seizures. Ketosis may also improve brain-function when a person's body cannot properly use glucose, such as in Alzheimer's patients and those with concussions or other brain damage.

In addition to improved brain-function, ketones can improve muscle performance, such as in endurance athletes. This is because the body can only store and convert about 100-minutes' worth of glycogen into useful glucose during extreme and prolonged exercise, such as in bicycle races and long-distance running. Athletes can train to extend their body's capacity, but there are limits. Yet, with a second or alternative source of energy, from ketones, the body can continue to perform beyond the individual's capacity to produce glucose. Further, studies have shown that ketones can improve endurance performance by as much as two percent.

SUMMARY

An aspect can include a beverage including a mixture of water and one or more additives. The one or more additives are provided at a concentration of at least 0.5 percent by volume. The one or more additives including at least one of the following: D ethyl 3-hydroxybutyrate, D 1,3-butanediol, D beta hydroxybutyrate salts, D beta hydroxybutyrate/D 1,3-butanediol monoester, D ethyl hydroxybutyrate, hydroxybutyrate (3-hydroxy-, 3-ethoxy-1-methyl-3-oxopropyl ester), D hydroxybutyric acid, and (R, R) Butanoic acid, 3-hydroxy-, 3-ethoxy-1-methyl-3-oxopropyl ester.

An aspect can include a beverage. The beverage can include D ethyl 3-hydroxybutyrate and/or D 1,3-butanediol. The percent by volume of D ethyl 3-hydroxybutyrate and/or D 1,3-butanediol can be of at least 0.5 percent, greater than 5 percent, between 5 and 19 percent, and/or equal to or greater than 19 percent.

In some embodiments, the beverage can include flavor from hops including hops essence. In other embodiments, the beverage can have fruit flavors.

Another aspect can include a process for making a beverage. The process can include brewing a beer, halting fermentation, and adding D ethyl 3-hydroxybutyrate and/or D 1,3-butanediol. The fermentation in the brewing step can be halted before the percentage of alcohol by volume reaches 0.5 percent. The addition of D ethyl 3-hydroxybutyrate and/or D 1,3-butanediol can increase the percentage of alcohol by volume to at least 0.5 percent. The D form may be more bioavailable and provide a greater benefit to the consumer. However, the racemic form is currently a low cost option, which may be more accessible to some consumers.

Yet another aspect can include a process for making a beverage. The process can include fermenting a mixture and adding D ethyl 3-hydroxybutyrate and/or D 1,3-butanediol to the mixture. The mixture can include water and a fermentable food. Fermentation can achieve a percentage of alcohol by volume. D ethyl 3-hydroxybutyrate and/or D 1,3-butanediol can be added to the mixture to increase the percentage of alcohol by volume to at least 0.5 percent.

In some embodiments, the fermenting step can be halted before the percentage of alcohol by volume reaches 0.5 percent. In other embodiments, the fermenting step can achieve at least 0.5 percent of ethanol by volume and/or greater. In the latter embodiment, ethanol can be extracted from the mixture to decrease the percentage of alcohol to less than 0.5 percent before adding D ethyl 3-hydroxybutyrate and/or 1,3-butanediol to bring the percentage back up to at least 0.5 percent.

Other features and associated advantages will become apparent with reference to the following detailed description of specific embodiments in connection with the accompanying drawings.

The free acid, D-beta-hydroxybutyrate and the salts thereof may be added to alter and improve the flavor profile while at the same time increasing the net grams of D-beta-hydroxybutyrate without increasing the alcohol content.

DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
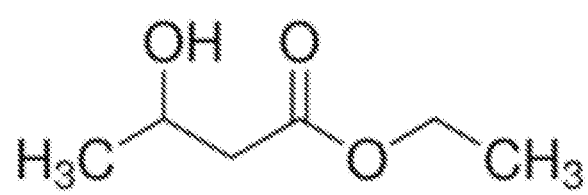
FIG. 1 is a line-angle formula of DL Ethyl 3-hydroxybutyrate.
Figure 2:
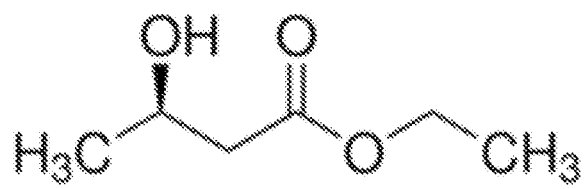
FIG. 2 is a line-angle formula of D Ethyl 3-hydroxybutyrate.
Figure 3:
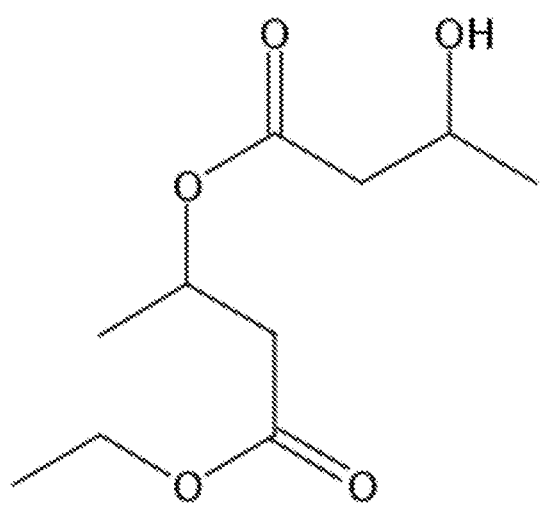
FIG. 3 is a line-angle formula of 3-hydroxy-, 3-ethoxy-1-methyl-3-oxopropyl ester.
Figure 4:
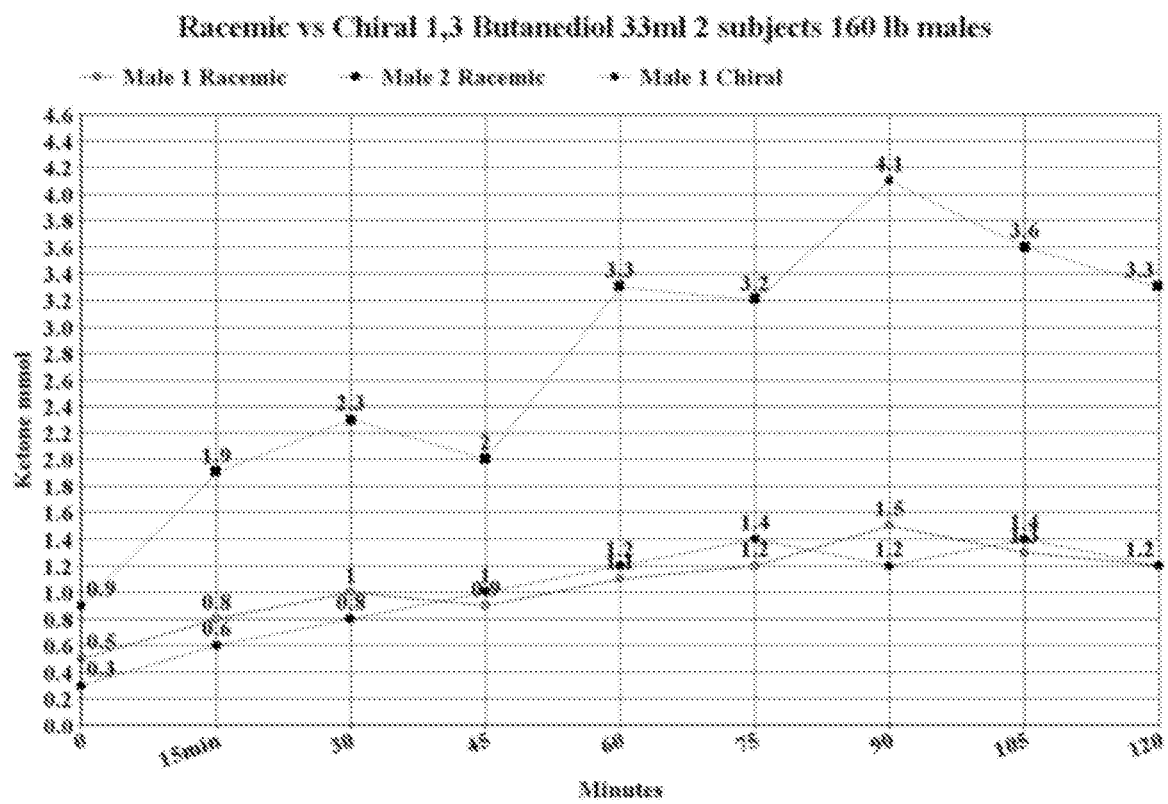
FIG. 4 is a graph illustrating blood ketone levels of racemic 1,3-butanediol in comparison to chiral 1,3-butanediol.

A detailed explanation of the composition of matter and process according to preferred embodiments of the present invention are described below.

D ethyl 3-hydroxybutyrate, and D 1,3-butanediol have each been shown to be safe for human consumption. D ethyl 3-hydroxybutyrate, and D 1,3-butanediol can each be converted into β-hydroxybutyrate and can serve as a substrate for brain metabolism. In addition, D ethyl 3-hydroxybutyrate, and D 1,3-butanediol are hypoglycemic agents, meaning they can reduce glucose levels in the blood. Moreover, when used, e.g., as an alcohol in a beer, it can help initiate and/or maintain ketosis.

Beers, like many ethanol-based beverages, contain carbohydrates. Imbibing beer and/or ethanol-based beverages can prevent the initiation of ketosis and can destroy ketosis. Enjoying such beverages can be difficult while trying to maintain or initiate ketosis. Those wishing to initiate and/or maintain ketosis, whether it be for wellbeing, weight loss, health, lifestyle, and/or other reasons, can enjoy beer and/or alcoholic beverages while facilitating ketosis by drinking beer and/or beverages that utilize D ethyl 3-hydroxybutyrate and/or D 1,3-butanediol in place of, or in addition to, ethanol. Moreover, unlike ethanol, the use of D ethyl 3-hydroxybutyrate and/or D 1,3-butanediol can reduce the glycemic effects of ingesting the carbohydrates of the beer or beverage.

As used herein, the term "beverage" can relate to consumable liquids including but not limited to water, carbonated water, naturally and/or artificially flavored waters, soft drinks, teas, juices, extractions, alcohol-containing beverages, and other known consumable liquids. Beverages can also include fermented beverages such as but not limited to beers, ciders, wine, kombucha, spirits, hard soda, and other known consumable alcoholic beverages.

Embodiments can include a ketogenic friendly beer for those that pick a ketogenic diet, which can entail maintaining ketone bodies in the blood at levels, for example, above 0.5 mmol/L by restricting calories or carbohydrate intake. Drinking beer that contains D ethyl 3-hydroxybutyrate and/or D 1,3-butanediol can help maintain ketone body levels in the blood. Moreover, the D ethyl 3-hydroxybutyrate and/or D 1,3-butanediol can help suppress glucose levels in the blood and counteract the taking onboard of carbohydrates from in the beer. For example, a person may maintain a ketone body level of about 2.5 mmol/L. Drinking ethanol-based beer can result in a significant drop in the person's ketone body level to, e.g., 0.2 mmol/L, the person can maintain and can even increase his or her ketone body level by drinking D ethyl 3-hydroxybutyrate and/or D 1,3-butanediol beer. Depending on the ratio of D ethyl 3-hydroxybutyrate and/or D 1,3-butanediol-to-carbohydrate, the person's ketone body level can be lowered, though less severely than from an ethanol beer, can be maintained, or can be increased.

In one embodiment, a "keto" beer or beverage, can facilitate ketosis. It should be understood that, as used herein, keto beer can refer to any beverage in which the molecules and their precursors D ethyl 3-hydroxybutyrate and/or D 1,3-butanediol are the primary alcohol ingredient. In some embodiments, any of the following including precursors, can be utilized: D beta hydroxybutyrate salts, D beta hydroxybutyrate, D 1,3-butanediol monoester, D ethyl hydroxybutyrate, hydroxybutyrate, D hydroxybutyric acid, and/or (R, R) Butanoic acid, 3-hydroxy-, 3-ethoxy-1-methyl-3-oxopropyl ester. Each The ratio of D ethyl 3-hydroxybutyrate and/or D 1,3-butanediol-to-total calorie of the beer can be chosen such as to facilitate a ketogenic diet by providing a neutral or better than neutral effect on ketone body levels in a drinker's blood. For those who are not in ketosis, for example a ketone level of 0.0 to 0.5 mmol/L, a keto beer can facilitate initiation of ketosis. In some embodiments, a keto beer can further reduce glucose levels that would otherwise be increased by the consumption of food, such as those in a meal.

Utilization of D ethyl 3-hydroxybutyrate and/or D 1,3-butanediol can have other benefits. Its use can provide a temporary ketogenic effect that can have benefits for weight loss and hunger suppression, as well as improvement in brain-function and increased physical performance. D ethyl 3-hydroxybutyrate and/or D 1,3-butanediol can be utilized to create a beer or other alcoholic beverage that can be lower in carbohydrates than existing beers and/or cocktails, or it can be used to create beverages that have a net effect on how a body treats those carbohydrates. Due to the appetite suppression nature of ketone bodies, a ketogenic friendly beer can provide drinkers a full feeling and prevent them from over-drinking. Based at least in part on this effect, a keto beer can be safer than ethanol. Unlike traditional beer that lowers inhibitions and can lead to further unregulated drinking, a keto beer can provide a fuller and more content feeling at a lower quantity consumed than with ethanol and can help reduce the desire to drink more and become intoxicated. The beverage may be useful for recovering alcoholics.

Some of those who imbibe alcoholic drinks can on occasion suffer from so-called hangovers. Keto beer may reduce the severity or even eliminate hangovers and side effects common from ethanol based beer and drink products.

A keto beer or wine can be made utilizing one or more of several steps. For example, in an embodiment, a beer can be made by providing mash, boiling the wort, adding hops, and then fermenting the wort into a beer, as known in the brewing arts. In the case of wine, grapes can be crushed and allowed to ferment. Ethanol from the fermentation can be extracted and replaced with D ethyl 3-hydroxybutyrate and/or D 1,3-butanediol. Extraction can be performed by boiling off the ethanol, which has a low boiling point of about 173° F. at sea level. Extraction can also be performed by fractional, or freeze, distillation, vacuum distillation, reverse-osmosis, or other methods for producing dealcoholized the beer. The beer can be considered dealcoholized, or nonalcoholic, when the ethanol content is less than 0.5 percent alcohol by volume. The substitution step can include providing the same, more, or less D ethyl 3-hydroxybutyrate and/or D 1,3-butanediol than the amount of extracted ethanol. To improve flavor, several steps can be performed before or after alcohol substitution, such as dry-hopping, flavor-masking agents, and/or flavoring agents.

Keto beer can be carbonated by injecting CO2. Carbonation from CO2 injection, while common and often acceptable, can cause metallic or sour flavors in some beverages. To further improve the taste of the beer, carbonation can be performed alternatively through a second fermentation. The beer can be carbonated with the addition of sugar and starter yeast. Very little ethanol is produced in the first 24-72 hours of this second fermentation but CO2 can be produced. The yeast can be specifically chosen from cultures known to produce little alcohol or that are alcohol intolerant.

In an embodiment, a keto beer can be brewed as described above. However, before the fermentation process achieves 0.5 percent alcohol by volume (ABV), fermentation can be halted. D ethyl 3-hydroxybutyrate and/or D 1,3-butanediol can be added to the beer to achieve a desired ABV percentage.

In an embodiment, the beverage is provided with an additive including preservatives, color additives, flavors and spices, flavor enhancers, emulsifiers, and stabilizers.

D Ethyl 3-hydroxybutyrate and/or D 1,3-butanediol can also be advantageously utilized as spirits. For example, substantially pure D ethyl 3-hydroxybutyrate and/or D 1,3-butanediol, or a high-content solution, can be utilized for mixing cocktails. The high-content solution can include D ethyl 3-hydroxybutyrate and/or D 1,3-butanediol and water. The solution can be aged with wood and/or include flavor additives. A benefit of such cocktails is that they can provide pleasant intoxicating effects while also providing health benefits of a ketogenic diet, for example by counteracting the carbohydrates present in most cocktail recipes and by maintaining ketosis. Such alcoholic beverages can assist in weight loss, either directly or from appetite suppression.

In an embodiment, the beverage is provided with an adjunct including solid and liquid adjuncts commonly used in the brewing arts.

In an embodiment, the beverage is provided with an additive including preservatives, color additives, flavors and spices, flavor enhancers, emulsifiers, and stabilizers.

In an embodiment, the beverage is provided as a low carbohydrate and even a zero carbohydrate beverage. In one example, a low carbohydrate beverage can include beverages having a carbohydrate total of less than 10 g per serving. All natural low calorie sweeteners such as Xylitol, Erythritol, monk fruit, and/or stevia and artificial sweeteners such as sucrose, sucralose, acesulfame potassium, aspartame, saccharin can be utilized at a suitable concentration typical in beverage formulation. The beverage can be formulated as a low calorie beverage, such as a beverage having less than 100 calories per serving.

The term "additive", as used herein can include D ethyl 3-hydroxybutyrate, D 1,3-butanediol, D beta hydroxybutyrate salts, D beta hydroxybutyrate, D 1,3-butanediol monoester, D ethyl hydroxybutyrate, hydroxybutyrate (3-hydroxy-, 3-ethoxy-1-methyl-3-oxopropyl ester), D hydroxybutyric acid, and (R, R) Butanoic acid, 3-hydroxy-, 3-ethoxy-1-methyl-3-oxopropyl ester. The one or more additives can be added in combination to provide a desirable and palatable flavor profile to the beverage while avoiding potential astringent or unpalatable flavors if provided individually. Further, it is known that pH balance and excessive salt intake are a result of over-ingestion of certain therapeutic compounds. Mixing the molecules listed herein may promote a healthy pH balance and salt intake post-ingestion.

When provided as an additive to a beverage, additive may, whether individually or in combination, provides an intoxicating effect to the consumer without the unfavorable side-effects of ethanol intoxication. Further, each molecule has been shown to promote, induce, sustain, and/or regulate ketosis which has been shown to have a number of desirable benefits.

Flavoring agents can include, natural flavoring substances, nature-identical flavoring substances, artificial flavoring substances, diacetyl, acetylpropionyl, acetoin, isoamyl acetate, benzaldehyde, cinnamaldehyde, ethyl propionate, methyl anthranilate, limonene, ethyl decadienoate, allyl hexanoate, ethyl maltol, ethylvannillin, methyl salicylate, manzate, glutamic acid, glycine salts, guanylic acid, inosinic acid, acetic acid, malic acid, citric acid, ascorbic acid, fumaric acid, and lactic acid. Coloring agents can be added to provide a favorable color to the beverage mixture.

In some embodiments, the beverage is provided in a single-serving container for consumer use. Alternatively, the beverage is provided in a multi-serving container such as a keg.

As one skilled in the art will appreciate, embodiments of the present invention may be embodied as, among other things, a composition of matter and a method for making compositions of matter. Other embodiments are within the scope of the following claims.

We claim:

1. A beverage comprising water and at least 0.5 percent by volume D-1,3-butanediol and no, or substantially no, L-1,3-butanediol, the beverage further optionally comprising one or more additives selected from the group consisting of D ethyl 3-hydroxybutyrate; D beta hydroxybutyrate salts; D beta hydroxybutyrate, D 1,3-butanediol monoester; 3-hydroxy-, 3-ethoxy-1-methyl-3-oxopropyl ester; D hydroxybutyric acid; ethanol; and combinations thereof.

2. The beverage of claim 1, further comprising a substrate.

3. The beverage of claim 1, wherein the substrate comprises one or more flavoring agents.

4. The beverage of claim 1, wherein the D-1,3-butanediol is present at a concentration of greater than 5 percent by volume.

5. The beverage of claim 1, wherein the D-1,3-butanediol is present at a concentration of greater than 19 percent by volume.

6. The beverage of claim 1, wherein the one or more additives are each partially or fully racemic.

7. A beverage comprising at least 0.5 percent by volume D-1,3-butanediol and no, or substantially no, L-1,3-butanediol, and one or more additives selected from the group consisting of D ethyl 3-hydroxybutyrate; D beta hydroxybutyrate salts; D beta hydroxybutyrate, D 1,3-butanediol monoester; 3-hydroxy-, 3-ethoxy-1-methyl-3-oxopropyl ester; D hydroxybutyric acid; ethanol; and combinations thereof.

8. The beverage of claim 1, wherein the beverage is fermented.

9. The beverage of claim 8, wherein the beverage comprises one or more flavoring agents.

10. The beverage of claim 1, wherein the beverage further comprises hops.

11. The beverage of claim 1, wherein the ethanol is not optional and is present at a concentration of less than 0.5 percent by volume.

12. The beverage of claim 8, wherein the ethanol is not optional and is present at a concentration of less than 0.5 percent by volume.

13. The beverage of claim 1, wherein the beverage is carbonated.

14. The beverage of claim 8, wherein the beverage is carbonated.

15. The beverage of claim 1, wherein the beverage comprises less than 10 g of carbohydrates per serving.

16. The beverage of claim 8, wherein the beverage comprises less than 10 g of carbohydrates per serving.

17. A beverage comprising water, at least 0.5 percent by volume D-1,3-butanediol, D beta hydroxybutyrate salts, and D beta hydroxybutyrate, wherein the beverage comprises no, or substantially no, L-1,3-butanediol.

18. The beverage of claim 8 wherein the beverage reduces the severity or eliminates hangovers and side effects of ethanol based beverages.

\* \* \* \* \*